United States Patent [19]

Fitzpatrick

[11] 4,125,163
[45] Nov. 14, 1978

[54] METHOD AND SYSTEM FOR CONTROLLING WELL BORE FLUID LEVEL RELATIVE TO A DOWN HOLE PUMP

[75] Inventor: Doug Fitzpatrick, Tulsa, Okla.

[73] Assignee: Basic Sciences, Inc., Tulsa, Okla.

[21] Appl. No.: 857,009

[22] Filed: Dec. 2, 1977

[51] Int. Cl.$^2$ .................. E21B 43/00; F04B 49/02; F04B 49/08
[52] U.S. Cl. .................. 166/314; 166/53; 166/65 R; 166/68; 166/250
[58] Field of Search .................. 166/314, 53, 250, 68, 166/68.5, 65 R, 75, 105; 417/15, 46, 362; 175/48, 50; 340/18 R, 18 P; 74/230.17 A, 230.17 F

[56] References Cited

U.S. PATENT DOCUMENTS

| | | | |
|---|---|---|---|
| 2,934,022 | 4/1960 | Rodick et al. | 417/362 |
| 3,018,666 | 1/1962 | Hoffman | 74/230.17 F |
| 3,559,731 | 2/1971 | Stafford | 166/65 R X |
| 3,731,549 | 5/1973 | Kaiser et al. | 74/230.17 A |
| 3,951,209 | 4/1976 | Gibbs | 166/314 X |
| 3,961,308 | 6/1976 | Parker | 175/48 X |
| 3,965,983 | 6/1976 | Watson | 166/314 X |
| 4,042,025 | 8/1977 | Skinner et al. | 166/53 X |
| 4,078,620 | 3/1978 | Westlake et al. | 175/48 |

FOREIGN PATENT DOCUMENTS

| | | | |
|---|---|---|---|
| 2,549,692 | 5/1976 | Fed. Rep. of Germany | 166/53 |
| 344,109 | 8/1972 | U.S.S.R. | 166/314 |

*Primary Examiner*—Stephen J. Novosad
*Attorney, Agent, or Firm*—Head, Johnson & Chafin

[57] ABSTRACT

A system for maintaining well bore fluid level to increase oil well production. The fluid level is monitored by a down hole pressure sensing device which relays the fluid level information to the surface by acoustical transmissions where, based on the information received, the speed of the pumping is varied to maintain an optimum fluid level.

13 Claims, 7 Drawing Figures

METHOD AND SYSTEM FOR CONTROLLING WELL BORE FLUID LEVEL RELATIVE TO A DOWN HOLE PUMP

BACKGROUND OF THE INVENTION

1. Field of the Invention

The present invention relates to a system for optimizing well production and more particularly, but not by way of limitation, to a down hole fluid level monitoring system coupled with a controlled variable speed pumping apparatus for maintaining a desired well bore fluid level to increase production.

2. History of the Art

The rate of flow of oil from a reservoir into the well bore is governed by numerous factors. Some of these are characteristic of the reservoir or of the method in which the well was completed, and as such, manipulation of the rate of flow is beyond the control of the well operator.

However, other factors change gradually over the life of the well and many require that the operator modify his production techniques and eventually begin secondary recovery procedures. One factor over which the operator has direct day to day control is the well bore fluid level. This variable has a direct relationship to the efficiency of well production, and the maintenance of this level at the proper height is one of the primary goals of the well operator.

The typical down hole configuration is that of a well casing which is perforated near the lower end thereof in communication with the oil reservoir. Concentric within this casing is the well tubing the lower end of which is in communication with the interior of the casing and which contains a pumping unit.

The pumping unit is operated by a reciprocal sucker rod contained within the tubing and during the pumping operation, the tubing above the pump and surrounding the sucker rod contains the oil which is being pumped to the surface. Stated another way, during pumping operations the tubing above the pump is generally full of oil to the surface. The annulus fluid level between the tubing and the casing may be anywhere from the surface down to the pump inlet itself. This annulus fluid level creates a back pressure at the perforations in the casing which is proportional to the density of the fluid multiplied by the height of the annulus fluid level. This back pressure reduces the effective pressure gradient from the reservoir to the well bore and thereby decreases the production of oil from the well. However, if the annulus fluid level can be kept just above the pump level the back pressure is reduced allowing more oil to flow in from the surrounding reservoir. When the annulus fluid level falls to the level of the pump or below, dry pumping occurs referred to as "fluid pounding" which can cause excessive damage to the pumping unit.

Therefore, it can be stated that when the fluid height is at the pump inlet level production is zero and as the fluid level rises above the pump level production sharply rises to its maximum value and then starts to fall off as the column height of the annulus fluid level increases thereby creating greater back pressure. When the back pressure exerted by the fluid level equals the static reservoir pressure, oil ceases to enter the well bore and production again becomes zero.

Clearly, maximum production occurs when the fluid level is just high enough to charge the pump but too low to create any significant back pressure. From a practical standpoint the goal of maintaining a consistently low fluid level while avoiding fluid pound has been an impossible one. Common approximations include intermittent production of the well and fluid pound detectors which shut the well in after it begins to pound. Neither of these approaches is completely satisfactory since they do not yield production and they do not eliminate shock and starting loads on pumping equipment.

SUMMARY OF THE PRESENT INVENTION

The present invention provides a system particularly designed and constructed to provide down hole pressure telemetry which is coupled to a surface pumping unit which has a variable speed control system.

In operation, the down hole unit which is provided with pressure sensing equipment to intermittently determine the annulus fluid level is activated by an internal timer at approximately two minute intervals. The down hole unit measures the back pressure created by the annulus fluid level and compares it with preset values.

If the height of the fluid is above a maximum desired level then a "high level" signal is transmitted by acoustical means to the surface. The acoustical signals propagate up the tubing or even up the sucker rod itself to the surface where they are received, decoded and made available to a controlling unit. If a "low level signal" is detected, the controller removes power from the prime mover and makes an adjustment in the pumping speed, so that when pumping resumes it will be at a slower rate. On the other hand, if a "high level" signal is received the controller adjusts the pumping rate to a faster rate.

A third signal consisting of a "mid-range" signal causes no change in the pumping rate and serves only to verify proper system operation. Naturally with more sophisticated down hole equipment hereinafter described, various annulus levels within the high level and low level ranges may be encoded so that the precise fluid level may be transmitted.

The pumping rate is made continuously variable through the use of a hydrostatic transmission system. In the system, a prime mover such as an electric motor drives a variable volume hydraulic pump which in turn drives fluid through a hydraulic motor. The hydraulic motor is then coupled directly to the pumping unit through a typical belt drive or other suitable system. The speed of the hydraulic motor is determined by the volume of fluid pumped through it. Therefore, by controlling the volume of hydraulic fluid pumped through the hydraulic motor, the output speed of the hydraulic motor is varied. By the use of this system, the pumping rate is varied to produce an optimum annulus fluid level in the well bore.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENTS

Figure 1:
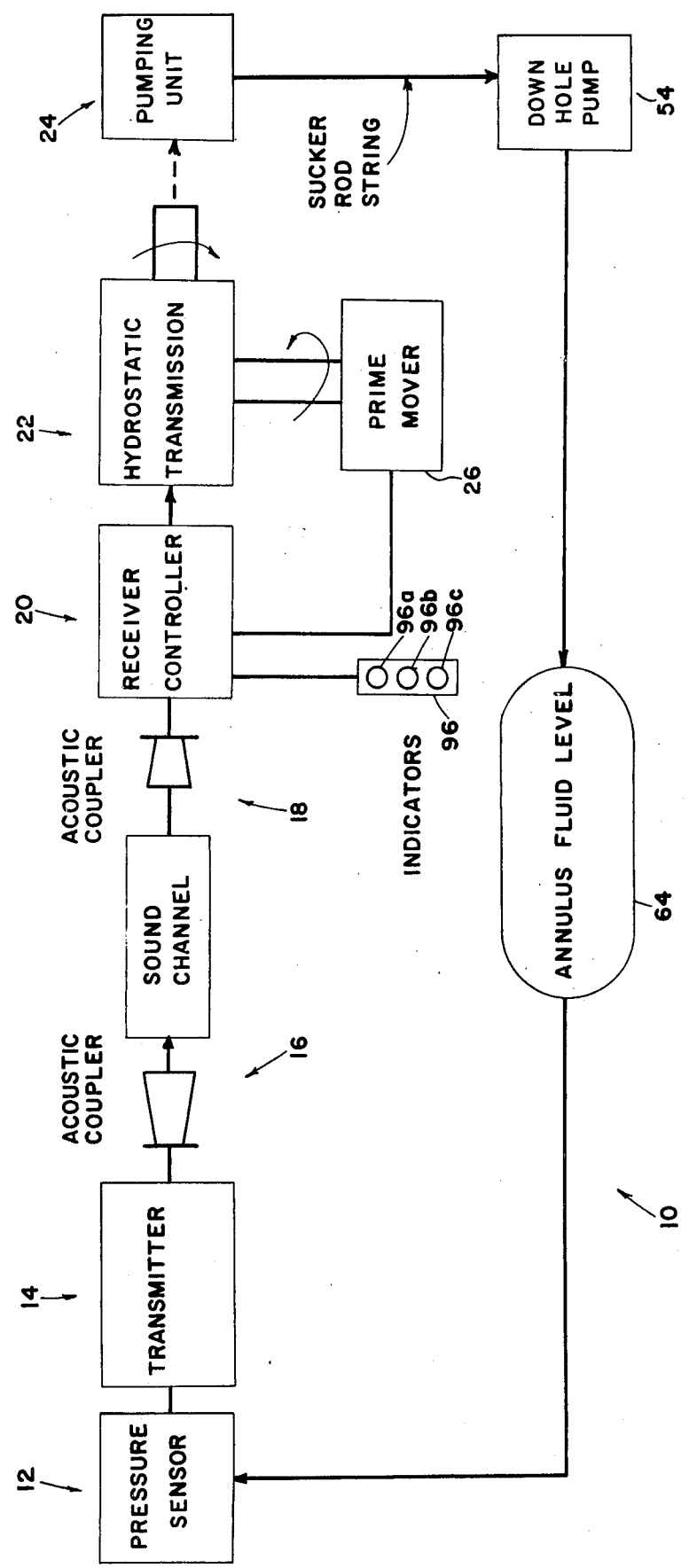
FIG. 1 is a functional flow block diagram depicting a closed loop system for controlling the annulus fluid level in a well bore.

Referring to the drawings in detail, reference character 10 generally indicates a system for maintaining well bore fluid levels which are conducive to increasing oil well production. The system 10 comprises a down hole fluid level sensor 12 which is coupled with a down hole transmitter 14 and an associated acoustic coupler 16. The coupler 16 is for the purpose of transmitting acoustic signals to a surface coupler 18 and an associated receiver controller 20 by means of a sound channel which may be either the well tubing or the sucker rod of a surface pumping unit 24. The output of the receiver controller then is operably connected to a hydrostatic transmission system 22 which in turn is utilized for varying the pumping speed of the surface pumping unit 24. The output of the receiver controller 20 is also connected to a prime mover 26 for a purpose that will be hereinafter set forth.

Figure 4:
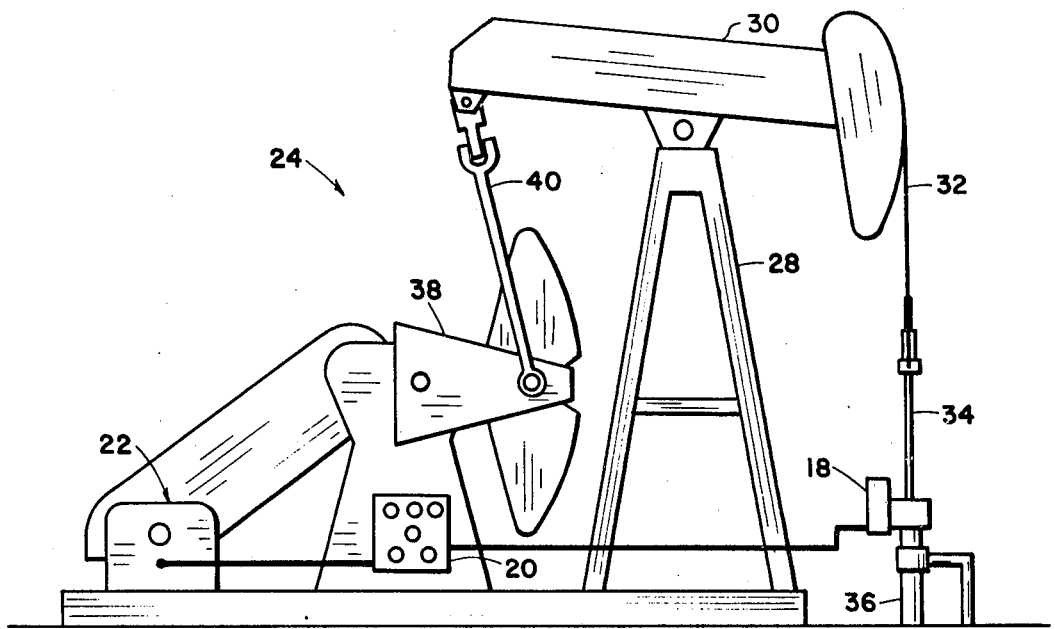
FIG. 4 is an elevational view of a surface pumping unit equipped with variable speed control embodying the present invention.

Referring now to FIG. 4, the surface pumping unit 24 generally consists of a frame member 28 having a pivotal horizontal beam 30 attached thereto. One end of the pivotal beam 30 has a cable 32 attached thereto the cable being connected to the upper end of a sucker rod 34. The sucker rod 34 extends downwardly into the well through a tubing chain 36 for ultimate connection with a down hole pump that will be hereinafter described. The opposite end of the beam 30 is connected to a pumping crank arm mechanism 38 by means of a pivotal rod 40. The crank 38 is rotated by a suitable hydrostatic drive system hereinbefore generally indicated by reference character 22 which in turn is operated by the prime mover 26. The surface acoustical coupler 18 is connected to the upper end of the tubing chain 36 and/or the sucker rod 34 and is operably connected to the receiver controller 20. The output of the receiver controller 20 is connected to the hydrostatic drive system 22. The hydrostatic drive 22 transmits its rotational power to the crank 38 by any well known means such as by the pulley and belt arrangement shown in FIG. 5 as indicated by reference characters 42 and 44, respectively.

Figure 2:
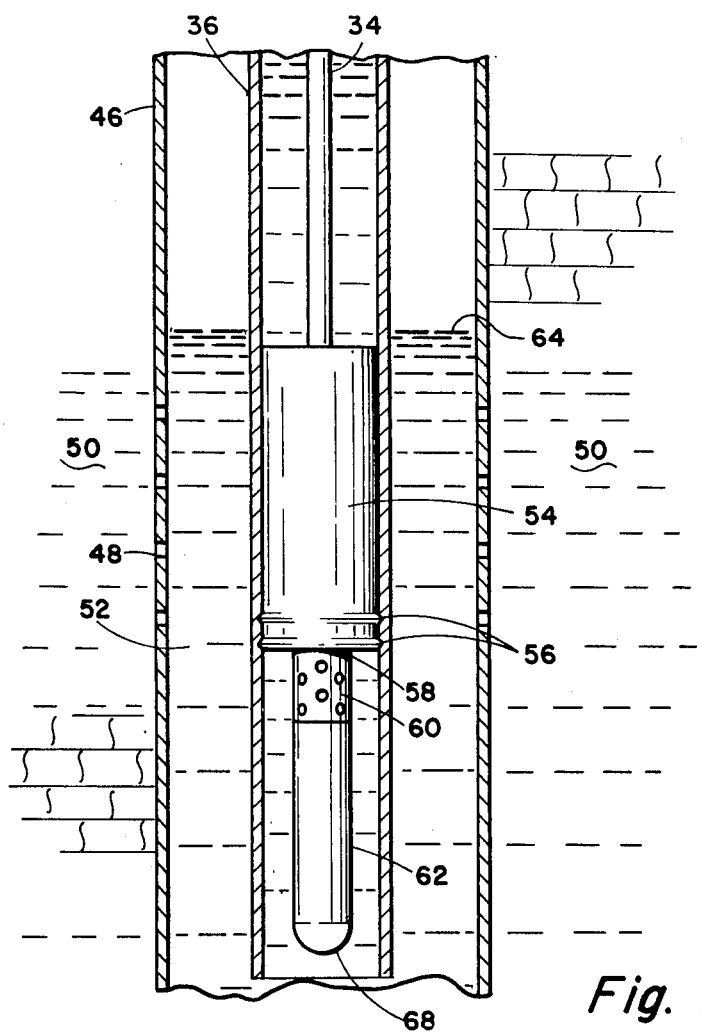
FIG. 2 is a sectional elevational view depicting a typical down hole pumping system equipped with a pressure sensing device for providing down hole pressure telemetry.

Referring to FIG. 2, a typical down hole arrangement is depicted in which the lower end of the tubing chain 36 is centrally disposed within an enlarged well casing 46 having a plurality of reservoir inlet apertures 48 therein. The inlet apertures 48 provide open communication between an oil reservoir 50 and a cylindrical annulus chamber 52 between the well casing 46 and the tubing 36.

A down hole pump housing 54 is secured within the lower end of the tubing 36 by any well known means such as by the expander rings 56. The pump housing 54 also comprises a reciprocating pumping unit 58 which is operably connected to the lower end of the sucker rod 34. The lower end of the unit 58 which is provided with a perforated nipple 60 whereby, when the reciprocating pumping member 58 is in its downward position the perforated nipple 60 is in open communication with the interior of the tubing below the pump sleeve 54 and hence adaptable for receiving an oil charge therethrough.

A down hole telemetry housing 62 is connected to the lower end of the reciprocating pump member 58 and contains the pressure sensor 12, transmitter 14 and acoustic coupler 16.

In operation, oil from the reservoir 50 flows through the apertures 48 in the casing 46 into the annulus chamber 52. Due to the pressure differential between the oil reservoir 50 and the annulus chamber 52, there is created an annulus fluid level generally indicated by reference character 64. Since the oil within the annulus chamber 52 is in communication with the lower end of the tubing 36, oil from the annulus chamber comes into contact with the perforated nipple 60 of the pumping unit.

During the pumping operation, the pump picks up the oil through the perforated nipple 60 and passes it through the pump housing 54 and lifts the oil through a pumping action through the tubing chain 36 surrounding the sucker rod 34 to the surface of the well.

Figure 3:
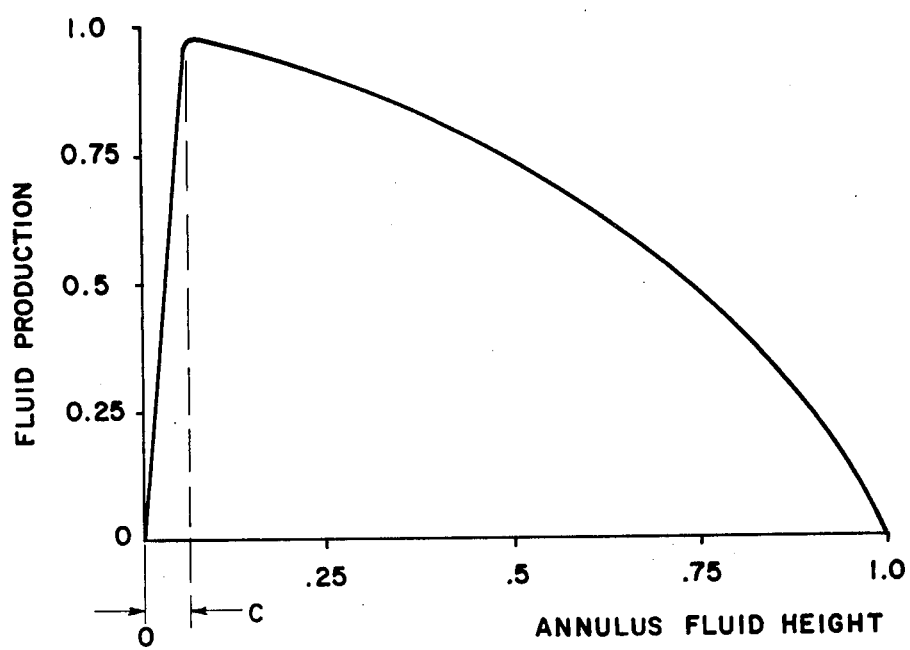
FIG. 3 is a normalized graph depicting fluid production as a function of annulus fluid height.

Referring now to FIG. 3, the graph shows the relationship between fluid production and the annulus fluid height 64. The calibrations of the graph have been normalized where it can be seen that when the annulus fluid height is no greater than the elevation of the pump, there is no oil production. However, as the annulus fluid height increases, production sharply increases up to maximum production at an annulus fluid height indicated by C. The letter C indicates the minimum height of the annulus fluid required to fully charge the pump. It can also be seen from the graph that as the annular height increases toward a normalized value of 1, production starts decreasing due to the back pressure created within the annulus chamber 52. When the annulus fluid level 64 rises to a height such that the pressure within the chamber 52 is equal to the pressure of the reservoir 50, production has again fallen off to zero since there will be no oil flow from the reservoir in through the apertures 48 in the casing 46. Therefore, it is desirable to maintain the annulus fluid height to a level just above the height required to charge the pump. The annulus fluid height can be adjusted upwardly by slowing down or stopping the pumping action and the annulus fluid height may be decreased by increasing the pumping speed. Naturally, if maximum pumping speed does not reduce the annulus fluid level, a larger pump is needed.

Figure 6:
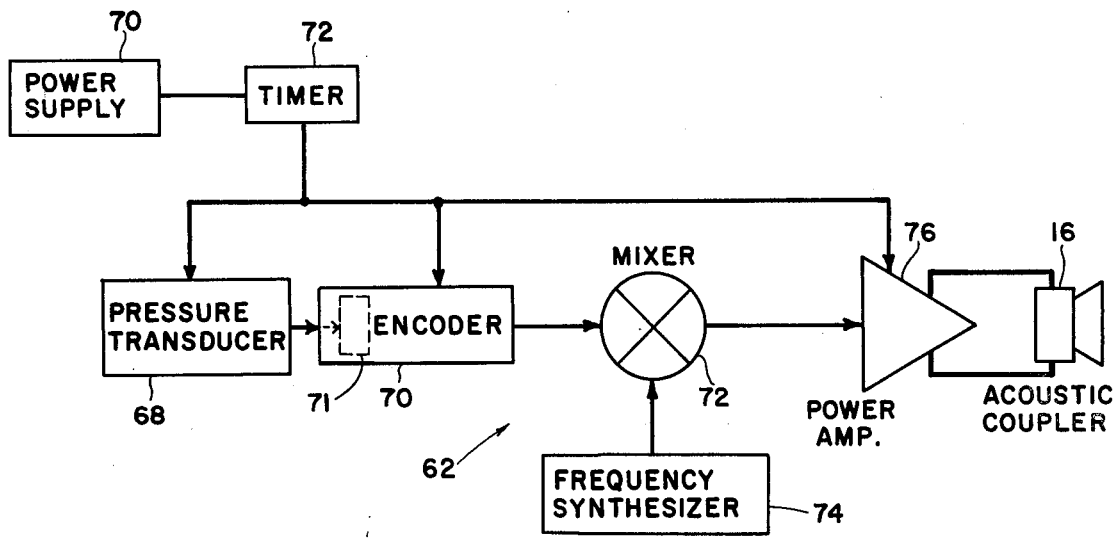
FIG. 6 is a schematic block diagram of the down hole telemetry portion of the system.

Referring now to FIG. 6, reference character 68 depicts a pressure transducer which is in communication with the interior of the tubing chain 36 below the pump and therefore in contact with the fluid contained therein. The pressure transducer is provided with power from a suitable down hole power supply 70 through a timer 72 which causes intermittant operation of the pressure transducer. The output of the pressure transducer is then supplied to an encoder circuit for converting the sensed pressure level which is in analog form into a useful form such as a digital word which is proportional to the pressure sensed by the pressure transducer 68. The encoder circuit 70 may include a comparator network 71 which is provided with a preset range within which is the desired annulus fluid level. When the comparator network 71 is included, the output of the encoder circuit 70 is a "high level" signal, a "low level" signal or a "mid-range level" signal. The output of the encoder 70 is then gated by a suitable mixing circuit 72 which receives a carrier provided by a frequency synthesizer 74. The output of the mixer circuit 72 is then provided to a transmitter power amplifier 76 which in turn is operably connected to the acoustical coupler 16. The acoustical coupler 16 is operably connected to the reciprocal pumping unit 58 whereby the acoustical signals will be transmitted through the pump housing 54 and transmitted along the tubing chain 36, but is simultaneously transmitted directly up the sucker rod 34.

Figure 7:
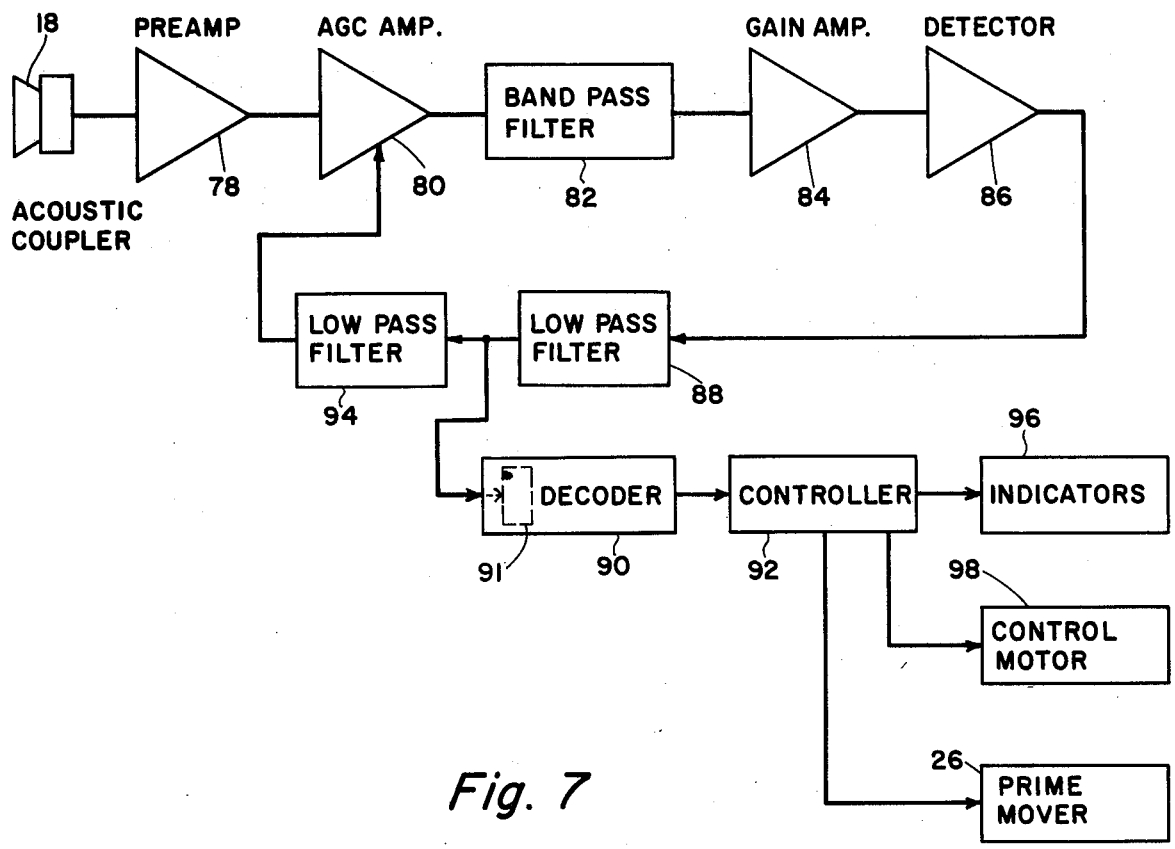
FIG. 7 is a schematic block diagram of the surface variable speed control system.

Referring now to FIG. 7, the surface acoustic coupler 18 is operably connected to the upper end of the tubing chain 36 or in contact with the reciprocating sucker rod 34 for receiving the acoustical signals from down hole telemetry system. The output of the acoustical coupler 18 is connected to a preamplifier 78 which acts as a low noise buffer, boosting the coded signal. The output of the amplifier 78 is connected to an automatic gain control (AGC) amplifier or leveler 80.

The output of the AGC amplifier 80 then is filtered by a band pass filter 82 to remove out-of-band noise and provided to a gain amplifier 84. The output of the gain amplifier 84 is provided to a detector circuit 86 to remove the carrier. The signal is then filtered through a low pass filter circuit 88. The output of the low pass filter 88 is then provided to a decoder 90 wherein the information is decoded and provided to a controller circuit 92. The decoder 90 may also include a microprocessor or comparator circuit 91 so that pressure data received directly from the down hole unit may be compared to predetermined levels and the decoded information provided to the controller.

The output of the low pass filter 88 is also connected through a filter 94 and is fed back into the AGC amplifier 80 to adjust the gain thereof.

The controller 92 upon receipt of the decoded information from the circuit 90 provides an output to a visual indicator panel 96 which will display "high level", "mid-range level" and "low level" indications as shown in FIG. 2 by reference characters 96a, 96b and 96c, respectively. The output of the controller is also provided to a control motor 98 which is an integral part of the hydrostatic transmission 22. When a "low level" signal is detected, the controller will provide a signal to the prime mover 26 to shut the prime mover down until receipt of either a "high level" signal or "mid-range" signal. The shut off signal to the prime mover 26 is provided as a safety measure to prevent the occurence of fluid pound due to a critically low annulus fluid level.

Figure 5:
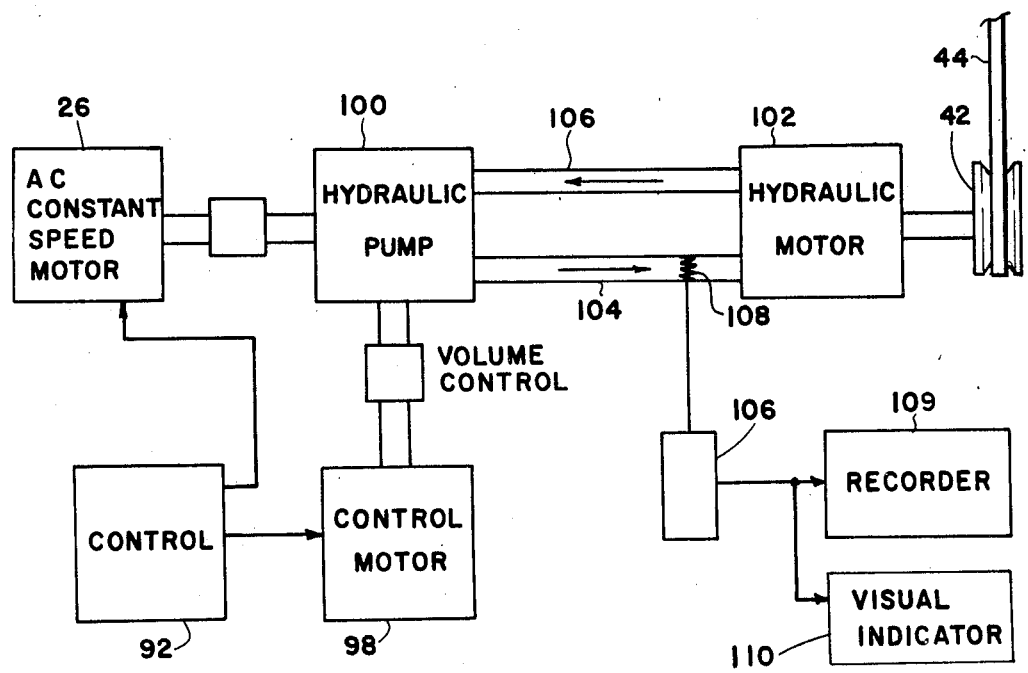
FIG. 5 is a functional block diagram of the pumping unit of FIG. 4.

Referring now to FIG. 5, the prime move 26 is depicted as an alternating current constant speed motor which is physically coupled to a variable volume hydraulic pump 100 which in turn drives fluid through a hydraulic motor 102 by means of the input line 104 and return line 106. The control motor 98 is operably connected through a suitable coupler to the hydraulic pump 100 for varying the amount of volume transmitted by the hydraulic pump through the hydraulic motor 102. Stated another way, when the volume from the hydraulic pump is reduced, the hydraulic motor 102 operates at a slower rate thereby rotating the pulley and belt members 42 and 44 at a lower rate. When the volume is increased from the hydraulic pump, the hydraulic motor 102 operates at a faster rate.

In order to log the operation of the surface unit 24, a transducer 106 having a probe 108 is installed within the inlet hydraulic line 104 to the hydraulic motor 102 for determining the pressure of the fluid in the line through the hydraulic motor which is directly proportional to the torque required by the pumping unit. The output of the transducer 106 may be provided to a suitable strip chart recorder 108 and to a visual indicator such as a meter 110. A history of the pumping torque requirements may result in the operator being able to replace the pumping unit with a smaller unit or generally permit the operator to properly size the pumping equipment to the particular well.

A second embodiment of the invention which would require a more sophisticated down hole circuitry would permit the encoder 70 to produce a signal directly proportional to the pressure sensed by the pressure transducer 68 whereby the mixer coupled with the frequency synthesizer would simply send this pressure reading to the surface to be received and decoded by the receiver controller unit 20. The comparator circuit 91 would then compare the pressure data received from the bottom hole with a preselected range of values relating to the annulus fluid height. The output of the controller would then continuously vary the control motor 98 to produce the optimum pumping speed for every pressure signal that was received from the down hole unit. Further, it is pointed out that the down hole timer 72 may be set on any desired interval.

The two major embodiments of the invention are: (1) that the comparator network 71 be included as a part of the down hole encoder 70 whereby high, low and mid-range signals are transmitted to the surface; and (2) that instead of using the network 71, the comparator circuit 91 be included as a part of the surface decoder 90 whereby the pump speed can be varied continuously.

From the foregoing, it is apparent that the present invention provides a system which will increase well production by continuously maintaining a low annulus fluid level while reducing equipment maintenance and repairs due to the elimination of fluid pound and starting loads. The application of the system will result in improved efficiency of surface processing equipment because the well will be flowing continuously instead of intermittently which in turn will reduce manpower requirements due to the automatic controls.

Other advantageous features of the present invention will be the availability of dynamometer readings by measuring and recording hydraulic pressure within the pressure line between the hydraulic pump 100 and hydraulic motor 102 whereby the hydraulic pressure in the line is directly proportional to the torque required by the pumping unit. Other side benefits include the improvement in field "power factor" by greatly reducing motor starting loads on utility power grids, while important information may be gained as to the build up analysis of the well by measuring the time between low level signals and high level signals with the well shut in.

Other analysis may be performed on the fluid reservoir itself by simply shutting the pump down and allowing the annulus fluid level to rise to its maximum level whereby a direct pressure reading will provide the pressure of the reservoir itself.

Whereas, the present invention has been described in particular relation to the drawings attached hereto, other and further modifications apart from those shown or suggested herein may be made within the spirit and scope of the invention.

What is claimed is:

1. A system for controlling well bore fluid level relative to a down hole pump comprising:
   (a) means for generating fluid pressure data disposed down hole in communication with fluids surrounding the pump;
   (b) a down hole transmitter for transmitting the fluid pressure data to the well surface;
   (c) means for comparing said fluid pressure data with a preselected range of values proportional to the desired well bore fluid level relative to the down hole pump and;
   (d) means for controlling well pumping speed disposed at the well surface and operably connected to the means for comparing fluid pressure data with said preselected range of values,
   whereby when the fluid pressure is too high, pumping speed is increased and when the fluid pressure is too low, the speed is decreased.

2. A system as set forth in claim 1 wherein the transmitter comprises an acoustical generator disposed in the proximity of the down hole pump whereby fluid pressure data is transmitted acoustically to the well surface along the well tubing, the fluid within the well tubing, and the pump sucker rod simultaneously.

3. A system as set forth in claim 2 wherein the means for controlling well pumping speed comprises a receiver disposed at the well surface for receiving the fluid pressure data from the transmitter, a variable speed drive operably connected to the pump and a controller circuit operably connected between the receiver and the variable speed drive.

4. A system as set forth in claim 3 wherein the variable speed drive comprises a hydrostatic transmission system comprising a positive displacement hydrostatic motor and a control motor to vary the volume per unit time through said hydraulic motor.

5. A system as set forth in claim 3 wherein the means for generating fluid pressure data comprises a fluid pressure sensor and an encoder, the output of the encoder being operably connected to the transmitter, and wherein the means for preparing fluid pressure data with a preselected range of values is a comparator operably connected to the receiver disposed of the well surface whereby the output of the controller circuit is provided to the variable speed drive to continuously vary the pumping speed to maintain the well bore fluid level to a desirable height above said down hole pump.

6. A system as set forth in claim 1 wherein the means for generating fluid pressure data comprises a fluid pressure sensor and an encoder and wherein the means for comparing the fluid pressure data with a preselected range of values is a comparator circuit operably connected to the encoder, the output thereof being operably connected to the transmitter.

7. A system as set forth in claim 6 wherein the output of the encoder represents a "high level" signal when the fluid pressure is greater than the preselected range of values, a "low level" signal when the fluid pressure is lower than the preselected range of values and a "midrange level" when the fluid pressure is within the preselected range of values.

8. A method for controlling well bore fluid level relative to a down hole pump comprising the steps of:
   (a) measuring fluid pressure at or near the pump;
   (b) comparing the measured fluid pressure with a preselected range of values proportional to the desired fluid level;
   (c) transmitting the comparison data to the well surface, and;
   (d) varying the pump speed in accordance with the comparison data;
   whereby when the pressure level is above the desired level, pumping speed is increased and when the pressure level is below the desired level pumping speed is decreased.

9. A method as set forth in claim 8 wherein the comparison data is converted to a coded acoustical signal and is transmitted along the well tubing and the well sucker rod to the well surface.

10. A method as set forth in claim 8 wherein the step of comparing the measured pressure with the preselected range of values yields three comparison outputs, a high level, a low level, and a mid-range level.

11. A method for controlling well bore fluid level relative to a down hole pump comprising the steps of:
    (a) measuring fluid pressure at or near the pump;
    (b) transmitting pressure data to the well surface;
    (c) comparing the measured pressure with a predetermined desired pressure level proportional to the desired well bore fluid level, and;
    (d) varying the pump speed in accordance with the comparison data whereby when the pressure level is above the desired level, pumping speed is increased and when the pressure level is below the desired level, the speed is decreased.

12. A method as set forth in claim 11 wherein the step of transmitting pressure data to the well surface comprises the step of transmitting acoustical coded signals along the well tubing and pump sucker rod.

13. A method as set forth in claim 11 wherein the pump speed is varied by varying the volume of hydraulic flow through a hydraulic pumping motor.

* * * * *